US012065084B2

(12) United States Patent
Schulze et al.

(10) Patent No.: US 12,065,084 B2
(45) Date of Patent: Aug. 20, 2024

(54) SOUND INSULATION ELEMENT FOR THE FIREWALL OF A VEHICLE BODY AND SUPPORT ELEMENT FOR A SOUND INSULATION ELEMENT OF THIS TYPE

(71) Applicant: ADLER PELZER HOLDING GMBH, Hagen (DE)

(72) Inventors: Volkmar Schulze, Schierling (DE); Frank Riederer, Witten (DE); Thomas Karcz, Dortmund (DE)

(73) Assignee: ADLER PELZER HOLDING GMBH (DE)

( * ) Notice: Subject to any disclaimer, the term of this patent is extended or adjusted under 35 U.S.C. 154(b) by 302 days.

(21) Appl. No.: 17/416,353

(22) PCT Filed: Dec. 10, 2019

(86) PCT No.: PCT/EP2019/084363
§ 371 (c)(1),
(2) Date: Jun. 18, 2021

(87) PCT Pub. No.: WO2020/126651
PCT Pub. Date: Jun. 25, 2020

(65) Prior Publication Data
US 2022/0073013 A1    Mar. 10, 2022

(30) Foreign Application Priority Data
Dec. 18, 2018   (DE) .................... 10 2018 132 726.9

(51) Int. Cl.
*B60R 13/08*    (2006.01)
*B32B 3/26*     (2006.01)
(Continued)

(52) U.S. Cl.
CPC ............ *B60R 13/083* (2013.01); *B32B 3/266* (2013.01); *B32B 3/30* (2013.01); *B32B 5/18* (2013.01);
(Continued)

(58) Field of Classification Search
CPC ... B60R 13/08; B60R 13/0815; B60R 13/083; B60R 13/0846; B60R 2013/0807;
(Continued)

(56) References Cited

U.S. PATENT DOCUMENTS 4,991,406 A    2/1991  Fuji et al. .................... 62/296
5,588,810 A   12/1996  DiFlora et al. ............. 417/312
(Continued)

FOREIGN PATENT DOCUMENTS

CN      1290220      4/2001   ............ B60R 13/08
CN    101601085     12/2009   ........... G10K 11/168
(Continued)

OTHER PUBLICATIONS

International Search Report and Written Opinion issued in PCT/EP2019/084386, dated Mar. 30, 2020, with English translation, 14 pages.
(Continued)

*Primary Examiner* — Edgardo San Martin
(74) *Attorney, Agent, or Firm* — HAYES SOLOWAY P.C.

(57) ABSTRACT

A sound insulation element for the wall of a vehicle body between the passenger compartment and the engine compartment has a front side facing the passenger compartment formed by the outer side of A plastic carrier layer, and a rear side which rests against the front wall formed by the outer side of a sound-absorbing layer. At least one holding-down projection projects from the plastic carrier layer at and/or offset from the edge of the hole of the carrier layer on the inner side of the plastic carrier layer facing away from the
(Continued)

outer side of the plastic carrier layer facing the sound-absorbing layer, which is embedded in the sound-absorbing material of the sound-absorbing layer and whose free ends facing away from the plastic carrier layer are substantially aligned with the outer side of the sound-absorbing layer facing away from the plastic carrier layer.

18 Claims, 5 Drawing Sheets

(51) Int. Cl.
  B32B 3/30 (2006.01)
  B32B 5/18 (2006.01)
  B32B 5/32 (2006.01)
  B32B 7/08 (2019.01)
  B32B 25/04 (2006.01)
  B32B 25/14 (2006.01)
  B32B 27/06 (2006.01)
  B32B 27/30 (2006.01)
  B32B 27/32 (2006.01)
  F02B 77/13 (2006.01)
  G10K 11/168 (2006.01)

(52) U.S. Cl.
  CPC .......... *B32B 5/32* (2013.01); *B32B 7/08* (2013.01); *B32B 25/045* (2013.01); *B32B 25/14* (2013.01); *B32B 27/065* (2013.01); *B32B 27/30* (2013.01); *B32B 27/32* (2013.01); *G10K 11/168* (2013.01); *B32B 2250/02* (2013.01); *B32B 2250/24* (2013.01); *B32B 2266/0278* (2013.01); *B32B 2305/022* (2013.01); *B32B 2307/102* (2013.01); *B32B 2605/08* (2013.01)

(58) Field of Classification Search
  CPC ........ B62D 25/08; B62D 25/082; B32B 5/22; B32B 3/30; B32B 7/08; B32B 7/04; G10K 11/168; G10K 11/16; G10K 11/162; F02B 77/13; F02B 77/11
  See application file for complete search history.

(56) References Cited

U.S. PATENT DOCUMENTS

| | | | | |
|---|---|---|---|---|
| 5,787,219 | A | 7/1998 | Mueller | |
| 5,831,225 | A * | 11/1998 | Campbell | F16B 5/065 24/324 |
| 6,062,033 | A | 5/2000 | Choi | 62/296 |
| 6,089,349 | A * | 7/2000 | Aye | B29C 45/4407 181/290 |
| 7,070,848 | B2 * | 7/2006 | Campbell | B60R 13/083 181/290 |
| 7,980,358 | B2 | 7/2011 | Saltau et al. | E04B 1/82 |
| 8,337,975 | B2 * | 12/2012 | Mally | B29C 44/1257 428/140 |
| 2005/0056481 | A1 | 3/2005 | Mafi et al. | 181/202 |
| 2006/0091699 | A1 | 5/2006 | Braun et al. | 296/181.2 |
| 2007/0065644 | A1 | 3/2007 | Blomeling | B29C 43/00 |
| 2007/0137926 | A1 | 6/2007 | Albin | |
| 2007/0218790 | A1 | 9/2007 | Schradin | 442/38 |
| 2008/0099275 | A1 | 5/2008 | Seel | 181/202 |
| 2010/0183841 | A1 | 7/2010 | Mally | B32B 5/18 |
| 2016/0285178 | A1 | 9/2016 | Wimmer | |
| 2018/0080666 | A1 | 3/2018 | Gotou et al. | F24F 1/12 |
| 2020/0031292 | A1 | 1/2020 | Riederer et al. | B60R 13/0846 |
| 2020/0259291 | A1 | 8/2020 | Lienert | |
| 2021/0280991 | A1 | 9/2021 | De Cloet | |
| 2023/0082634 | A1 | 3/2023 | Riederer | |
| 2023/0178936 | A1 | 6/2023 | Fritsch | |

FOREIGN PATENT DOCUMENTS

| | | | | |
|---|---|---|---|---|
| CN | 201646596 | | 11/2010 | B60R 13/08 |
| DE | 33 284 | | 4/1989 | B60R 13/08 |
| DE | 32 571 | | 10/1992 | B29C 67/20 |
| DE | 33 098 | | 1/2000 | B68G 7/05 |
| DE | 10235091 | | 7/2002 | G10K 11/168 |
| DE | 2004 008 165 | | 11/2005 | B60R 13/08 |
| DE | 2013 006 300 | | 10/2014 | F16S 1/00 |
| EP | 786 851 | | 4/2013 | B29C 44/12 |
| JP | 63188544 | | 8/1988 | B60R 13/08 |
| JP | 343051 | | 4/1991 | B60R 13/08 |
| JP | 7-285138 | | 10/1995 | B29C 39/10 |
| JP | 200110419 | | 1/2001 | B60R 13/08 |
| JP | 2006327528 | | 12/2006 | B60R 13/08 |
| JP | 2007106300 | | 4/2007 | B60R 13/08 |
| JP | 2007106300 | A * | 4/2007 | |
| JP | 2007198312 | | 8/2007 | F02B 77/13 |
| WO | WO2014161959 | | 10/2014 | B29C 44/12 |
| WO | WO 2018/192858 | | 10/2018 | B60R 13/08 |

OTHER PUBLICATIONS

International Preliminary Report on Patentability issued in PCT/EP2019/084386, dated Jun. 16, 2021, 6 pages.
International Search Report and Written Opinion issued in PCT/EP2019/084363, dated Feb. 6, 2020, with English translation, 17 pages.
International Preliminary Report on Patentability issued in PCT/EP2019/084363, dated Jun. 16, 2021, 7 pages.
Domininghaus, Hans: Die Kunststoffe und ihre Eigenschaften, 5th, completely revised and updated edition. Berlin [u.a.] : Springer, 1998, p. 285—ISBN 9783-662-06664-5, 8 pages.
Erhard, Gunter: Konstruieren mit Kunststoffen, 4th edition, München: Hanser, 2008, p. 332—ISBN 978-3-446-41646-8, 5 pages.
Notice of Allowance issued in related U.S. Appl. No. 17/416,870, dated Sep. 27, 2023, 8 pages.
Japanese Official Action issued in related Application Serial No. 2021-5349997, dated Oct. 4, 2023, with translation, 11 pages.
U.S. Appl. No. 17/416,870, filed Jun. 21, 2021, Riederer et al.
Chinese Official Action issued in related Application Serial No. 2019800924852, dated Nov. 30, 2023, with translation, 13 pages.

* cited by examiner

SOUND INSULATION ELEMENT FOR THE FIREWALL OF A VEHICLE BODY AND SUPPORT ELEMENT FOR A SOUND INSULATION ELEMENT OF THIS TYPE

CROSS-REFERENCE TO RELATED APPLICATIONS

The present patent application claims the priority of German patent application 10 2018 132726.9 dated 18 Dec. 2018, the contents of which are hereby incorporated by reference into the subject matter of the present patent application.

BACKGROUND OF THE INVENTION

The invention relates to a sound insulation element for the front wall of a vehicle body separating the passenger compartment from the engine compartment. Furthermore, the invention relates to a support element for a sound insulation composite component for arrangement on the front wall of a vehicle body.

It is generally known to arrange a sound insulation element on the inside of the front wall of a vehicle body, i.e. on the inside of the wall between the passenger compartment and the engine compartment of a vehicle body. As an example of such a front wall insulation, reference is made to WO-A-2018/192858, US-A-2006/0091699 or DE-A-37 33 284.

Such sound insulation elements have a sandwich structure which has a plastic carrier layer, also known as heavy layer, and a sound damping layer moulded onto the plastic carrier layer and made of sound absorbing material, in particular a PUR foam material. The front wall of the vehicle body has several lead-throughs for lines, pipes or components. Accordingly, the sound insulation element is also provided with through openings which are typically aligned with the lead-throughs in the front wall. Depending on the type of element passing through the sound insulation element and through the front wall, it is necessary to protect it from mechanical damage (scuff protection). One possible measure for implementing such protection is to foam around the hole-edge of a passage opening of the sound insulation element or to surround it with sound insulation material.

The sound damping material is typically moulded onto the plastic carrier layer in a specially designed moulding tool (usually a foaming tool) into which the plastic carrier layer is inserted. The plastic carrier layer has previously been produced in another mould provided for this purpose. In the area of hole edges of the plastic carrier layer that are at least partially embedded by sound-absorbing material, the sound-absorbing material must be able to reach at least partially into the carrier layer hole. In part, the sound absorbing material should surround the hole edge on both sides of the plastic backing layer. In both cases, this can cause the plastic carrier layer to "float" within the tool mould in which it is inserted during the manufacturing process, which can lead to unsatisfactory manufacturing results. To avoid this, the corresponding moulds for moulding the sound-absorbing material onto the plastic carrier layer have holding-down pins which hold down the plastic carrier layer along a hole edge which is to be at least partially enclosed by sound-absorbing material. Such moulding tool holding-down pins increase the manufacturing costs of the moulding tool and complicate the cleaning process which, in principle, has to be carried out from time to time with such moulding tools. In addition, the sound-absorbing layer formed with such a moulding tool has cavities caused by the holding-down projections, which is acoustically disadvantageous.

It is known from DE-A-10 2013 006 300 that a core of an appliance handle, which is to be surrounded by plastic, can be positioned centrally in a mould by means of spacer pins projecting from the core on all sides. This procedure is not suitable for 2-component parts whose one plastic component is to be provided with the second plastic component on one side only.

DE-C-198 33 098 discloses a method for manufacturing a padded article with a core and a padded cover surrounding it on all sides.

SUMMARY OF THE INVENTION

The object of the invention is to provide a sound insulation element for the front wall of a vehicle body arranged between the passenger compartment and the engine compartment, and a carrier element for such a sound insulation element, with the aid of which the effort required on the tool side to maintain the position of the carrier element in the moulding tool for moulding sound damping material onto the carrier element can be reduced.

To solve this problem, the invention proposes a sound insulation element for the front wall of a vehicle body arranged between the passenger compartment and the engine compartment, wherein the sound insulation element is provided with a composite component comprising a plastic carrier layer and a sound-absorbing layer connected thereto,
wherein the composite component has a front side facing the passenger compartment and formed by the outer side of the plastic carrier layer when viewed in its installed state, and a rear side abutting the front wall which is formed by the outer side of the sound-absorbing layer facing away from the plastic carrier layer, and
at least one first passage opening in the composite component,
wherein the first passage opening comprises a carrier layer hole with a hole edge formed in the plastic carrier layer and a sound absorbing layer hole with a hole edge formed in the sound absorbing layer, and
wherein at least one holding-down projection projects from the plastic carrier layer at and/or offset from the hole edge of the carrier layer hole on the inner side of the plastic carrier layer facing away from the outer side of the plastic carrier layer and thus facing the sound-absorbing layer, which holding-down projection is embedded in the sound-absorbing material of the sound-absorbing layer and whose free ends facing away from the plastic carrier layer are substantially flush with the outer side of the sound-absorbing layer facing away from the plastic carrier layer.

Accordingly, the invention provides, instead of a holding-down projection arranged on the moulding tool, a holding-down projection which is part of the plastic carrier layer, i.e. part of the carrier element of the sound insulation element to which the sound absorbing material is moulded. Such a holding-down projection is located at the hole edge or outwardly offset from the hole edge of an aperture, i.e. a hole in the plastic carrier layer, which together with a hole aligned therewith in the sound-absorbing layer forms a feedthrough of the sound-insulating element.

In the sound insulation element according to the invention, the at least one holding-down projection, which may be pin-shaped or dome-shaped, for example, is embedded in the sound-absorbing material of the sound-absorbing layer. It is expedient that several such holding-down projections exist circumferentially around a hole edge of a carrier layer hole. Unlike in the prior art, in which the holding-down projections (holding-down pins) are part of one of the moulding tool parts for moulding the sound-absorbing material onto the plastic carrier layer, in the sound-insulating element according to the invention there are no cavities in the sound-absorbing layer after deforming from the moulding tool; rather, the hold-down projections of the plastic carrier layer extend into the sound-absorbing layer and possibly through it.

The sound insulation element according to the invention is designed as a composite component, as already described above, and has a plastic carrier layer (so-called heavy layer) and a sound absorbing layer made of sound absorbing material (e.g. PU foam). The composite component, which is constructed in two layers in this way, has two outer sides, one of which is formed by the plastic carrier layer and the other by the sound-absorbing layer. The inner sides of both layers are in contact with each other; the two layers are connected to each other at the inner sides. In the installed state, the outer side of the plastic carrier layer faces the passenger compartment; this side of the composite component forms the front side, while the rear side of the composite component is formed by the outer side of the sound-absorbing layer, which rests against the front wall.

The at least one holding-down projection now protrudes from the inside of the plastic carrier layer in the region of a hole in the carrier layer, the free end of which projection facing away from the back of the plastic carrier layer is essentially flush with the outside of the sound-absorbing layer, in that the free end does not protrude over the outside of the sound-absorbing layer but is rather preferably covered comparatively thinly (e.g. at least 1 mm and at most 5 mm) by sound-absorbing material.

As already mentioned, it is useful to provide several holding-down projections around a hole edge, which are then expediently in the form of pins or domes. The design of the holding-down projections or of the at least one holding-down projection should be selected in such a way that, in the tool mould by means of which the sound-absorbing material is moulded onto the plastic carrier layer, this sound-absorbing material can flow around and over the at least one holding-down projection. If, in a useful embodiment of the invention, a collar at least partially surrounding the hole in the carrier layer is used as the holding-down projection, the collar should have recesses in its circumferential wall or edge recesses open towards the upper edge. With such a design of the collar, the sound-absorbing material introduced into the tool mould can flow through the collar.

The construction of the sound insulation element according to the invention described above serves in particular to form the edges of the holes in the plastic carrier layer which are provided with sound-absorbing material. The sound-absorbing material has a projecting area which protrudes into the hole in the carrier layer and is flush with the outside of the plastic carrier layer or protrudes forwards and thus surrounds the edge of the hole on both sides. To prevent unwanted shearing off of the sound-absorbing material can be formed into anchoring projections, breakthroughs or the like to provide hooking structures between the plastic carrier layer and the sound-absorbing layer. Examples of breakthroughs filled with sound-absorbing material in the plastic carrier layer in the area of penetrations of the sound-insulating element can be found in DE-A-41 32 571, EP-A-2 786 851 and JP H07-285 138 A.

In an advantageous further development of the invention, it is provided that sound-absorbing material of the sound-absorbing layer protrudes inwards into the first hole over the edge of the hole of the carrier layer hole and forms an annular protruding edge.

In this embodiment, it may further be advantageously provided that the projecting edge is aligned with the outside of the plastic carrier layer or extends along at least a portion of the edge of the hole of the carrier layer hole on the outside of the plastic carrier layer. Advantageously, the sound insulation element according to the invention may further be provided with at least a second passage opening in the composite component comprising a carrier layer hole formed in the plastic carrier layer and a sound absorbing layer hole formed in the sound absorbing layer, both holes having aligned hole edges.

In addition to the sound insulation element according to the invention described above, the above-mentioned object can also be solved according to the invention by a carrier element for a sound insulation composite component for arrangement on a front wall of a vehicle body provided between the engine compartment and the passenger compartment, wherein the carrier element is provided with
- a plastic carrier layer with an outer side and with an inner side, onto which sound absorbing material of a sound absorbing layer of the sound insulation composite component can be applied or is applied in a moulding tool having at least two moulding tool parts,
- at least one first carrier layer hole with a hole edge formed in the plastic carrier layer and
- at least one holding-down projection arranged on and/or offset from the edge of the hole, projecting from the plastic carrier layer and protruding from the inside of the plastic carrier layer,
- wherein the plastic carrier layer can be introduced into the moulding tool with its outer side bearing against a first moulding tool part and the end of the at least one holding-down projection facing away from the inner side of the plastic carrier layer is provided for contacting a second moulding tool part for holding the plastic carrier layer bearing against the first moulding tool part in the region of the hole edge of the first carrier layer hole.

In order to be able to realise a hole edge of the plastic carrier layer provided with sound insulation material in such a carrier element, it is possible, for example, that the first hole of the plastic carrier layer is provided for penetration with radial clearance to the hole edge of the first carrier layer hole by means of a moulding tool core, in particular by means of a moulding tool core, which is arranged on the first or the second moulding tool part of the moulding tool provided for moulding the sound absorbing material onto the rear side of the plastic carrier layer.

The carrier element can advantageously be formed with holding-down projection structures as previously described in connection with the sound insulation element. Also, the plastic carrier layer of the carrier element can be formed as described above in connection with the invention. In particular, the plastic carrier layer of the carrier element can be provided with sound insulation material and the sound absorbing layer as provided above in the context of the invention.

BRIEF DESCRIPTION OF THE DRAWINGS

The invention is explained in more detail below by means of an example of an embodiment and with reference to the drawing. In detail, it is shown in.

DETAILED DESCRIPTION OF THE INVENTION

Figure 1:
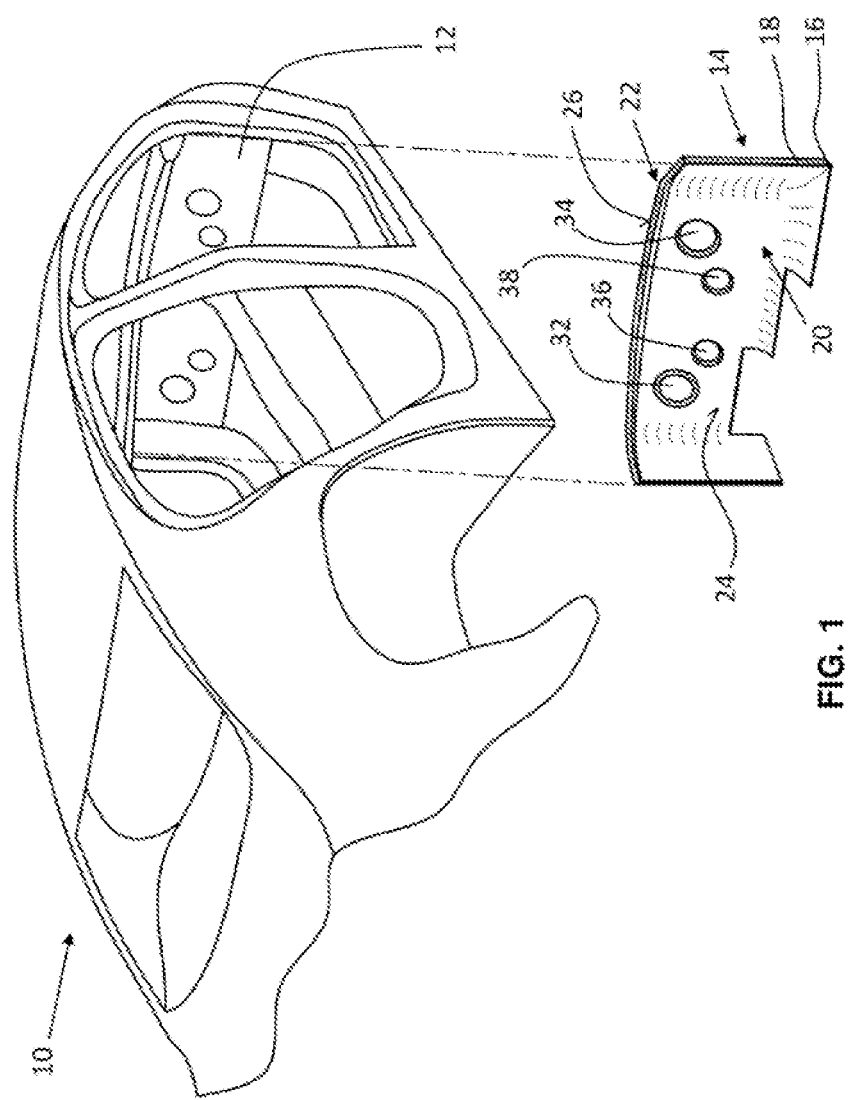
FIG. 1 a perspective and exploded view of a vehicle body with front wall sound insulation element, FIG. 2 a perspective view of the design of the heavy layer, i.e. the plastic carrier layer of the sound insulation element according to FIG. 1, FIG. 3 a cut through the moulding tool for moulding sound insulation material onto the plastic carrier layer according to FIG. 2, wherein the latter is inserted into the moulding tool, FIG. 4 a cut through the moulding tool as shown in FIG. 3 but after the sound absorbing material has been inserted, FIG. 5 a view of the rear side of the sound insulation element resting against the front wall of the vehicle body when the sound insulation element is installed, FIG. 6 a perspective view of the sound insulation element from the rear, FIG. 7 a cut through the sound insulation element according to line VII-VII of FIG. 6 and FIG. 8 a perspective view of an alternative design of a holding-down projection.

FIG. 1 schematically shows a vehicle body 10 with front wall 12 on which a sound insulation element 14 designed as a composite component is arranged. The sound insulation element 14 is fixed to the front wall 12 at least in part by means of fixing projections (not shown) which are formed integrally with the sound insulation element 14 and which, in the assembled state of the sound insulation element 14, cooperate with a respective receiving opening in the vehicle body 10 or in the front wall 12 in which the fixing projections are placed. In this regard, reference is made by way of example to WO-A-2018/192858, the contents of which are hereby made part of the subject matter of the present disclosure by reference.

Figure 6:
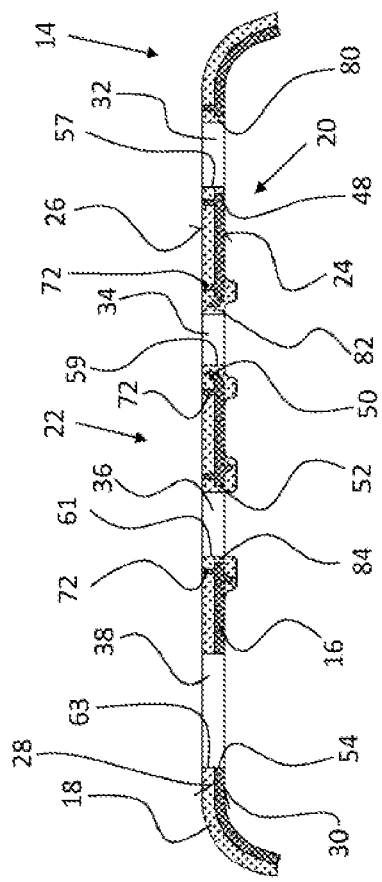

As is known per se, the sound insulation element 14 has a so-called mass-spring system which comprises a plastic carrier layer 16 as a heavy or mass layer made of, for example, EVA/PE, PE, PP, EPDM, TPE, TPO and/or polyurethane foam, each of which is provided with a high proportion by weight of up to 70% of a high-density mineral filler, for example feldspar, and a sound-absorbing layer 18 (see, for example, FIG. 6) made of a sound-absorbing material (for example polyurethane foam).

Figure 7:
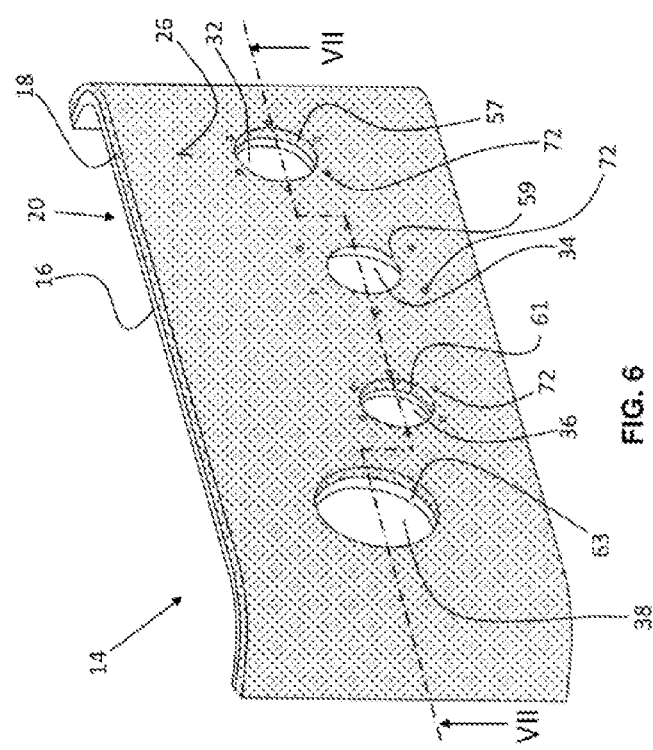

In the installed state as shown in FIG. 1, the sound insulation element 14 has a front side 20 facing the passenger compartment and a rear side 22 facing and abutting the front wall. The front side 20 is formed by the outer surface 24 of the plastic carrier layer 16, while the rear side 22 is formed by the outer surface 26 of the sound-absorbing layer 18. The plastic carrier layer 16 and the sound-absorbing layer 18 are connected to each other at their inner sides 28, 30 facing each other (see also FIG. 7).

The sound insulation element 14 has a plurality of passage openings 32, 34, 36, 38, which in this embodiment are of different shapes and are intended to show different types of passageways of a sound insulation element. With the exception of the passage opening 34, the other passage openings 34 shown in the figures are provided with sound absorbing material along the hole edges of holes in the plastic carrier layer 16. Moulding the sound absorbing material along these hole edges requires a certain amount of positioning assistance within the moulding tool provided for moulding the sound absorbing material, as shown in FIGS. 3 and 4.

Figure 3:
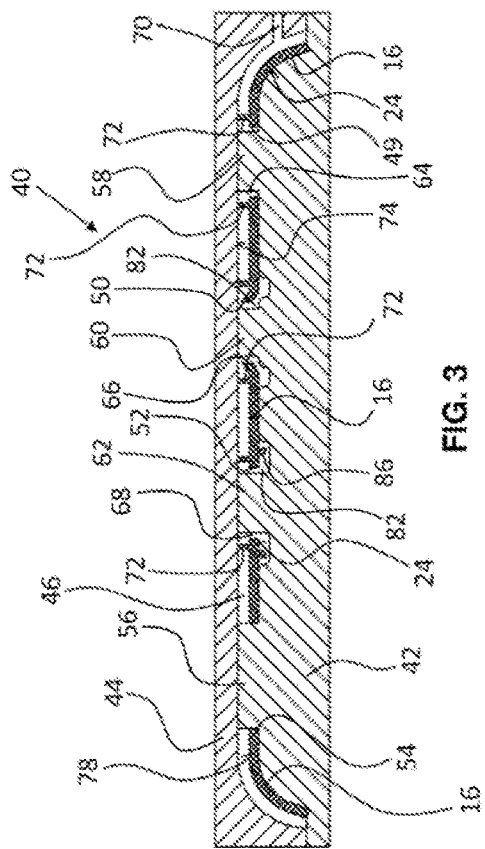
Figure 2:
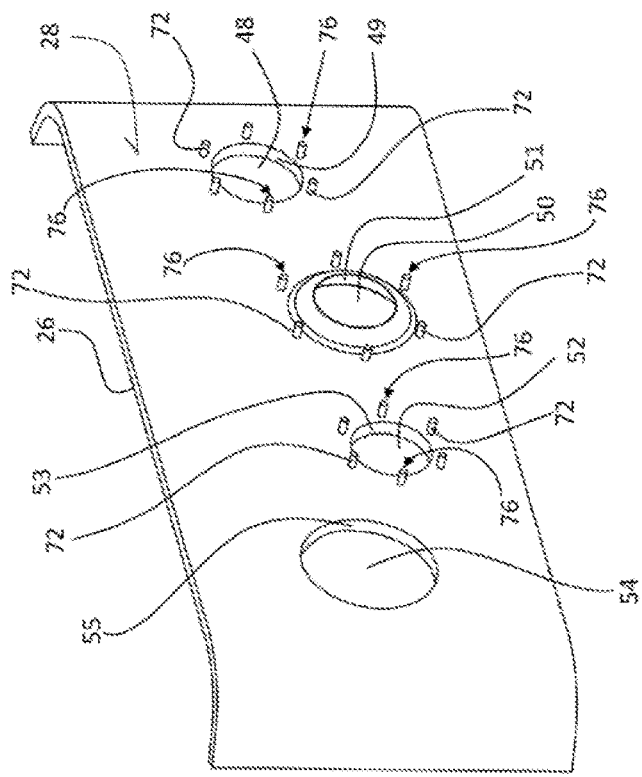
Figure 5:
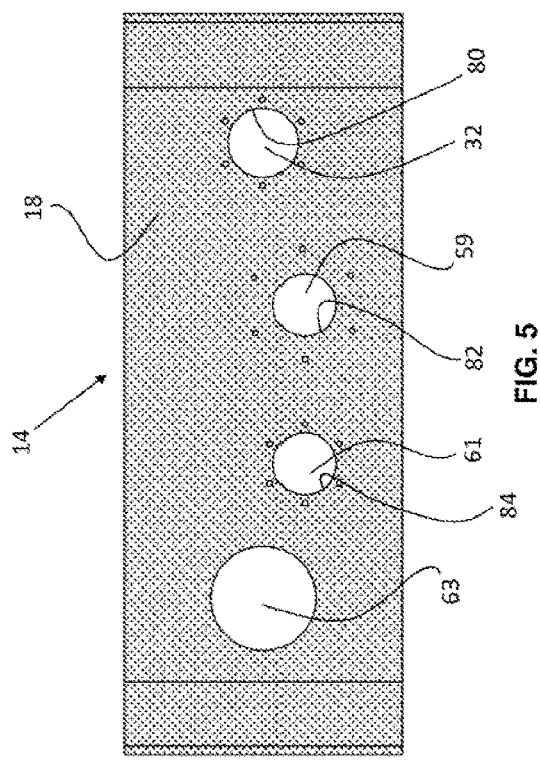

FIG. 3 shows a cross-section through a two-part moulding tool 40 in this embodiment, which has a first moulding tool part 42 and a second moulding tool part 44. The previously produced plastic carrier layer 16 is first placed into the mould cavity 46 of the moulding tool 40, with the outer surface 24 of the plastic carrier layer resting on the inner surface of the first moulding tool part 42. The moulding tool 40 is then moved together. In this embodiment example, four holes 48, 50, 52, 54 with hole edges 49, 51, 53, 55 are formed in the plastic carrier layer 16. A mould core 56 projects into the hole 54, completely filling the hole 54. Mould cores 58, 60, 62 project into each of the holes 48, 50, 52, which are smaller in cross-section than the said holes and thus leave free spaces 64, 66, 68 in the mould cavity 46 between themselves and the hole edges 49, 51, 53.

Figure 4:
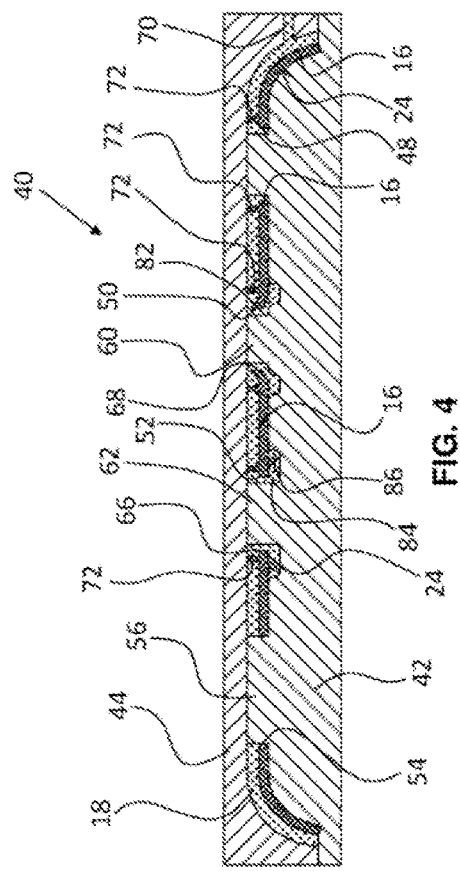

The free spaces are thus filled with sound-absorbing material, as can be seen from FIGS. 3 and 4, when this material is introduced into the moulding tool 40 via, for example, one (of in particular several) inlets 70. The mould cores 56, 58, 60, 62 provide holes 57, 59, 61, 63 in the sound absorbing layer 18 of the sound insulation element 14 which are respectively aligned with the carrier layer holes 48, 50, 52, 54.

The penetration of sound absorbing material into the holes 48, 50, 52 (no material penetrates into the hole 54 due to the mould core 56 completely filling this hole) poses the risk of the plastic carrier layer 16 being "washed out" and then "floating up" in the mould cavity 46. To prevent this, holding-down projections 72 (in this embodiment example all in pin or dome form) are arranged in the region of each hole 48, 50, 52 projecting from the inner side 28 of the plastic carrier layer 16, which projections rest against the inner side 74 of the second moulding tool part 44 bounding the mould cavity 46 or whose free ends 76 are arranged at a short distance to the moulding tool part 44. These holding-down projections 72 hold the plastic carrier layer 16 positioned against the inner side 78 of the first moulding tool part 42. This prevents the plastic carrier layer 16 from "floating" as the sound absorbing material penetrates and flows around the edges of the holes 48, 50, 52.

Depending on the desired design of enclosing or surrounding or partially surrounding the edges of the holes 48, 50, 52 with sound-absorbing material, the plastic carrier layer 16 has different structures in the area of said holes, as shown in FIGS. 3 and 4 or 6 and 7. For example, the projecting edge 80 in hole 48 is aligned with the outer surface 24 of the plastic carrier layer 16, while the corresponding projecting edge 82, 84 of holes 50, 52 surrounds the hole edges 51, 53 on both sides. With regard to the design of the hole 52, it is additionally provided that additional hook structures or the like projections 86 protrude from the front side 20 of the plastic carrier layer 16, which are embedded in the sound-absorbing material and thus ensure additional retention of the sound-absorbing layer 18 on the front side 20 of the plastic carrier layer 16.

Figure 8:
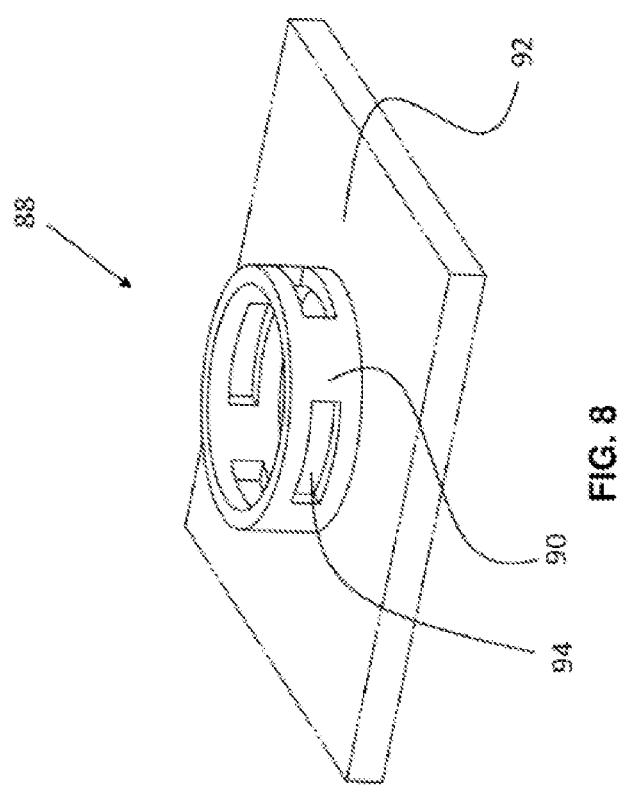

FIG. 8 shows an alternative embodiment of a holding-down projection 88. In this embodiment, the holding-down projection 88 is formed as a circumferential collar 90 that extends around the opening in the plastic carrier layer indicated at 92. The collar 90 has apertures 94 through which sound insulation material can pass to near the edge of the hole in the plastic carrier layer 92 or around the edge of the hole thereof, as shown for the hole designs in FIG. 3. When provided with sound insulation material, the holding-down projection 88 is embedded in this material.

REFERENCE LIST 10 vehicle body 12 front wall 14 sound insulation element
16 plastic carrier layer
18 sound absorbing layer
20 front side
22 rear side
24 outer surface of front side
26 outer side
28 inner side
30 inner side
32 passage opening
34 passage opening
36 passage opening
38 passage opening
40 two-piece moulding tool
42 first moulding tool part
44 second moulding tool part
46 mould cavity
48 carrier layer hole
59 hole edge
50 carrier layer hole
51 hole edge
52 carrier layer hole
53 hole edge
54 carrier layer hole
55 hole edge
56 mould core
57 sound absorbing layer hole
58 mould core
59 sound absorbing layer hole
60 mould core
61 sound absorbing layer hole
62 mould core
63 sound absorbing layer hole
64 free cavity
66 free cavity
68 free cavity
70 inlet
72 holding-down projection
74 inner side of the mould cavity
76 free end of the holding-down projection
78 inner side of the mould cavity
80 projecting edge
82 projecting edge
84 projecting edge
86 projection
88 holding-down projection
90 collar
92 plastic carrier layer
94 aperture in collar

BIBLIOGRAPHY

WO-A-2018/192858
US-A-2006/0091699
DE-A-37 33 284
EN-A-10 2013 006 300
EN-C-198 33 098
DE-A-41 32 571
EP-A-2 786 851
JP H07-285 138 A

The invention claimed is:

1. A sound insulation element for an end wall of a vehicle body arranged between passenger compartment and engine compartment, with
a composite component comprising a plastic carrier layer and a sound-absorbing layer connected thereto, wherein the composite component has a front side facing the passenger compartment and formed by the outer surface of the plastic carrier layer, as viewed in its installed state, and
a rear side which bears against the front wall and is formed by the outer side of the sound-absorbing layer facing away from the plastic carrier layer, and
at least one first passage opening in the composite component,
wherein the first passage opening comprises a carrier layer hole formed in the plastic carrier layer having a hole edge and a sound absorbing layer hole formed in the sound absorbing layer having a hole edge, and
wherein at least one holding-down projection projects from the plastic carrier layer at the and/or offset to the hole edge of the carrier layer hole on the inner side of the plastic carrier layer facing away from the outer surface of the plastic carrier layer and thus facing the sound absorbing layer, which is embedded in the sound-absorbing material of the sound-absorbing layer and whose free ends facing away from the plastic carrier layer are substantially aligned with the outer side of the sound-absorbing layer facing away from the plastic carrier layer.

2. The sound insulation element according to claim 1, wherein the free end of the at least one holding-down projection facing away from the inner side of the plastic carrier layer is covered with sound-absorbing material.

3. The sound insulation element according to claim 1, wherein several holding-down projections are arranged circumferentially around the carrier layer hole.

4. The sound insulation element according to claim 1, wherein the at least one holding-down projection is formed as a pin-shaped projection or as a holding-down dome.

5. The sound insulation element according to claim 1, wherein the at least one holding-down projection is formed as a collar surrounding the carrier layer hole and having a peripheral wall provided with openings.

6. The sound insulation element according to claim 1, wherein sound absorbing material of the sound absorbing layer protrudes inwardly beyond the hole edge of the carrier layer hole and forms an annular protruding edge.

7. The sound insulation element according to claim 6, wherein the projection edge is aligned with the outside of the plastic carrier layer or extends along at least a portion of the hole edge of the carrier layer hole on the outside of the plastic carrier layer.

8. The sound insulation element according to claim 1, wherein at least one second passage opening in the composite component comprising a carrier layer hole formed in the plastic carrier layer and a sound absorbing layer hole formed in the sound absorbing layer, wherein both holes having aligned hole edges.

9. A carrier element for forming a sound insulation composite element as claimed in claim 1, having
a plastic carrier layer with an outer side and with an inner side, onto which sound absorbing material of a sound absorbing layer of the sound insulation composite component can be applied in a moulding tool having at least two moulding tool parts,
at least one first carrier layer hole with a hole edge formed in the plastic carrier layer and
at least one holding-down projection arranged on and/or offset from the edge of the hole, projecting from the plastic carrier layer and protruding from the inside of the plastic carrier layer, wherein an end of the at least one holding-down projection remote from an inner side of the plastic carrier layer is provided for contacting a second moulding tool part for holding the plastic carrier layer against the first moulding tool part in a region of the hole edge of the first carrier layer hole.

10. The carrier element according to claim 9, wherein the first hole of the plastic carrier layer is provided for penetration with radial clearance to the hole edge of the first carrier layer hole by a mould core, in particular by a mould core, which is arranged on the first or the second moulding tool part of the moulding tool provided for moulding the sound-absorbing material onto the rear side of the plastic carrier layer.

11. The carrier element according to claim 9, wherein the at least one holding-down projection and/or that the plastic carrier layer is formed as and/or that the plastic carrier layer is provided with a sound absorbing layer or with sound absorbing material comprising
a composite component comprising a plastic carrier layer and a sound-absorbing layer connected thereto,
wherein the composite component has a front side facing the passenger compartment and formed by the outer surface of the plastic carrier layer, as viewed in its installed state, and
a rear side which bears against the front wall and is formed by the outer side of the sound-absorbing layer facing away from the plastic carrier layer, and
at least one first passage opening in the composite component,
wherein the first passage opening comprises a carrier layer hole formed in the plastic carrier layer having a hole edge and a sound absorbing layer hole formed in the sound absorbing layer having a hole edge, and
wherein at least one holding-down projection projects from the plastic carrier layer at the and/or offset to the hole edge of the carrier layer hole on the inner side of the plastic carrier layer facing away from the outer surface of the plastic carrier layer and thus facing the sound absorbing layer, which is embedded in the sound-absorbing material of the sound-absorbing layer and whose free ends facing away from the plastic carrier layer are substantially aligned with the outer side of the sound-absorbing layer facing away from the plastic carrier layer.

12. The sound insulation element according to claim 2, wherein several holding-down projections are arranged circumferentially around the carrier layer hole.

13. The sound insulation element according to claim 2, wherein the at least one holding-down projection is formed as a pin-shaped projection or as a holding-down dome.

14. The sound insulation element according to claim 2, wherein the at least one holding-down projection is formed as a collar surrounding the carrier layer hole and having a peripheral wall provided with openings.

15. The sound insulation element according to claim 2, wherein sound absorbing material of the sound absorbing layer protrudes inwardly beyond the hole edge of the carrier layer hole and forms an annular protruding edge.

16. The sound insulation element according to claim 15, wherein the projection edge is aligned with the outside of the plastic carrier layer or extends along at least a portion of the hole edge of the carrier layer hole on the outside of the plastic carrier layer.

17. The sound insulation element according to claim 2, wherein at least one second passage opening in the composite component comprising a carrier layer hole formed in the plastic carrier layer and a sound absorbing layer hole formed in the sound absorbing layer, wherein both holes having aligned hole edges.

18. The carrier element according to claim 10, wherein the at least one holding-down projection and/or that the plastic carrier layer is formed as and/or that the plastic carrier layer is provided with a sound absorbing layer or with sound absorbing material comprising
a composite component comprising a plastic carrier layer and a sound-absorbing layer connected thereto,
wherein the composite component has a front side facing the passenger compartment and formed by the outer surface of the plastic carrier layer, as viewed in its installed state, and
a rear side which bears against the front wall and is formed by the outer side of the sound-absorbing layer facing away from the plastic carrier layer, and
at least one first passage opening in the composite component,
wherein the first passage opening comprises a carrier layer hole formed in the plastic carrier layer having a hole edge and a sound absorbing layer hole formed in the sound absorbing layer having a hole edge, and
wherein at least one holding-down projection projects from the plastic carrier layer at the and/or offset to the hole edge of the carrier layer hole on the inner side of the plastic carrier layer facing away from the outer surface of the plastic carrier layer and thus facing the sound absorbing layer, which is embedded in the sound-absorbing material of the sound-absorbing layer and whose free ends facing away from the plastic carrier layer are substantially aligned with the outer side of the sound-absorbing layer facing away from the plastic carrier layer.

\* \* \* \* \*